United States Patent [19]

Warmuth et al.

[11] Patent Number: 4,710,802

[45] Date of Patent: Dec. 1, 1987

[54] TELEVISION RECEIVER INCLUDING A CIRCUIT ARRANGEMENT FOR DEMODULATING AN NTSC-CODED COLOR SIGNAL

[75] Inventors: Otto L. Warmuth; Martin H. Johanndeiter, both of Hamburg, Fed. Rep. of Germany; Johannes G. Raven, Eindhoven, Netherlands

[73] Assignee: U.S. Philips Corporation, New York, N.Y.

[21] Appl. No.: 836,034

[22] Filed: Mar. 4, 1986

[30] Foreign Application Priority Data

Mar. 29, 1985 [DE] Fed. Rep. of Germany ....... 3511440

[51] Int. Cl.$^4$ ............................................... H04N 9/66
[52] U.S. Cl. ......................................... 358/25; 358/23
[58] Field of Search .................... 358/21 V, 23, 25, 40

[56] References Cited

U.S. PATENT DOCUMENTS

| | | | |
|---|---|---|---|
| 4,278,994 | 7/1981 | van der Valk | 358/25 |
| 4,546,378 | 10/1985 | Annegarn | 358/23 |
| 4,625,232 | 11/1986 | Nillesen | 358/23 |

*Primary Examiner*—Tommy P. Chin
*Attorney, Agent, or Firm*—Thomas A. Briody; William J. Streeter; Gregory P. Gadson

[57] ABSTRACT

A color television signal receiver includes a circuit arrangement for demodulating an NTSC-encoded chrominance signal available as a sequence of digital values. An oscillator circuit (33), which has an accumulator (16) and a waveform converter (31) produces two sine-shaped reference signals which are applied to a demodulator circuit (2). The accumulator (16) includes a register (18) and a (first) modulo-adder (17). A phase comparator circuit (12) controlling the phase of the reference signal receives at least one demodulated signal during the occurrence of the color synchronizing signal. The sawtooth-shaped accumulator output signal is added in a second adder (26, 38) during a first switching position of a change-over switch (23, 34) to an adjustable value and is thereafter applied to the waveform converter (31). In the second switching position of the change-over switch (23, 34), which only occurs during the occurrence of the color synchronizing signal, the accumulator output signal is applied unchanged to the waveform converter (31).

8 Claims, 2 Drawing Figures

TELEVISION RECEIVER INCLUDING A CIRCUIT ARRANGEMENT FOR DEMODULATING AN NTSC-CODED COLOR SIGNAL

BACKGROUND OF THE INVENTION

The invention relates to a color television signal receiver for demodulating an NTSC-coded chrominance signal available as a sequence of digital values, including an oscillator circuit producing two reference signals of the chrominance subcarrier frequency and being shifted relative to each other, the oscillator circuit comprising an accumulator incorporating a register and a (first) modulo-adder and a waveform converter which forms the reference signals from the accumulator output signal, and a phase comparator circuit controlling the phase of the reference signals and receiving during the occurrence of the color synchronizing signal a signal produced in at least one demodulator multiplying the chrominance signal by at least one of the reference signals.

Such a circuit arrangement is disclosed in the Collection of papers of the 15th annular conference of SMPTE in San Francisco, February 1981, pages 200–209, entitled: Digital Decoding of PAL and NTSC Signals Using Field Delay Comb Filters and Line-Locked Sampling, Author: C.K..P. Clarke. For the demodulation of the color signal it is necessary that the frequency and phase of a reference signal are controlled such that its phase corresponds to the phase of the color synchronizing signal. With NTSC-encoded composite color television signals, the phase position of the color producing part of the chrominance signal frequently changes on the transmission path relative to the color synchronizing signal, as the color synchronizing signal is always located at a constant basic level, namely on the back porch, but the color producing part of the chrominance signal is always superposed on the continuously fluctuating luminance signal. Such a phase shift of the color producing part of the chrominance signal relative to the color synchronizing signal is visible in the displayed picture as a hue change. The prior art circuit arrangement does not provide the possibility to compensate for this phase error.

In NTSC-television receivers the phase position of the color synchronizing signal is often adjusted, for example to offset the phase shift occurring on the transmission path between the color producing part of the chrominance signal and the color synchronizing signal. European Patent Application EP No. 00 67 999 discloses, for example, a circuit arrangement in which the output signal of the comparator circuit is applied to the analog oscillator via a digital-to-analog converter and in which the phase shift can be controlled by a user of a television receiver. By manual setting the characteristic of the phase comparator circuit is influenced and a different desired phase position is determined for the color synchronizing signal.

SUMMARY OF THE INVENTION

The invention has for its object to provide a circuit arrangement of the type described in the opening paragraph of such a structure that the phase shift between the color producing part of the chrominance signal and the color synchronizing signal is adjusted in a different manner.

According to the invention, this object is accomplished in that in a first positon of a change-over switch an adjustable value is added in a second adder to the accumulator output signal and the adder output signal is applied to the waveform converter and that the change-over switch is in a second position during the occurrence of the color synchronizing signal, in which second position the unchanged accumulator output signal is applied to the waveform converter.

In the circuit arrangement in accordance with the invention the output signal of the phase comparator circuit is now adapted, during the period of time in which the color synchronizing signal occurs, to the relative phase position of the color synchronizing signal. During the remaining portion of the time a constant value is present at the input of the accumulator, which forms therefrom a sawtooth-shaped signal whose frequency and phase depend on this constant value. If there is a phase shift between the color producing part of the chrominance signal and the color synchronizing signal, an adjustable value is applied to the second adder, as a result of which the phase of the sawtooth shaped signal is shifted. During the time in which the color synchronizing signal occurs, no adjustable value is added to the sawtooth-shaped signal, to ensure that the color synchronizing signal is demodulated with the appropriate phase position.

In a first further development of the invention, the change-over switch is arranged at the input of the waveform converter and in the first position the output of the second adder and in the second position the input of the waveform converter are connected to the output of the accumulator. In a second further developement of the invention it is provided that the adjustable value is only applied to the second adder via the change-over switch when the latter in in its first position. These two further developments of the invention will make it clear that the change-over switch may be connected to one of the two inputs of the second adder.

So as to ensure that individually occurring interferences of the color synchronizing signal do not directly act on the oscillator, a low-pass filter is included between the phase comparator circuit and the oscillator.

The reference signals required for demodulation are produced in the waveform converter, which comprises a read-only memory, in which a sine and a cosine signal are formed from the input signal.

To enable the hue change, desired by the user, that is to say the phase position between the color producing part of the chrominance signal and the color synchronizing signal must be changed, a user-adjustable digital value gnerator is provided which produces the adjustable value.

As the relative phase position of the color synchronizing signal has to be used as a comparison value for the reference signals, at least one switch, which is only closed during the occurrence of the color synchronizing signal, is arranged between the demodulator and the phase comparator circuit.

A customary separating circuit in the colour television signal receiver produces a color synchronizing blanking pulse from the composite color television signal, by means of which the switch and the change-over switch are controlled.

BRIEF DESCRIPTION OF THE DRAWINGS

Embodiments of the invention will now be described, by way of example, with reference to the accompanying drawings. Therein.

DETAILED DESCRIPTION OF THE INVENTION

Figure 1:
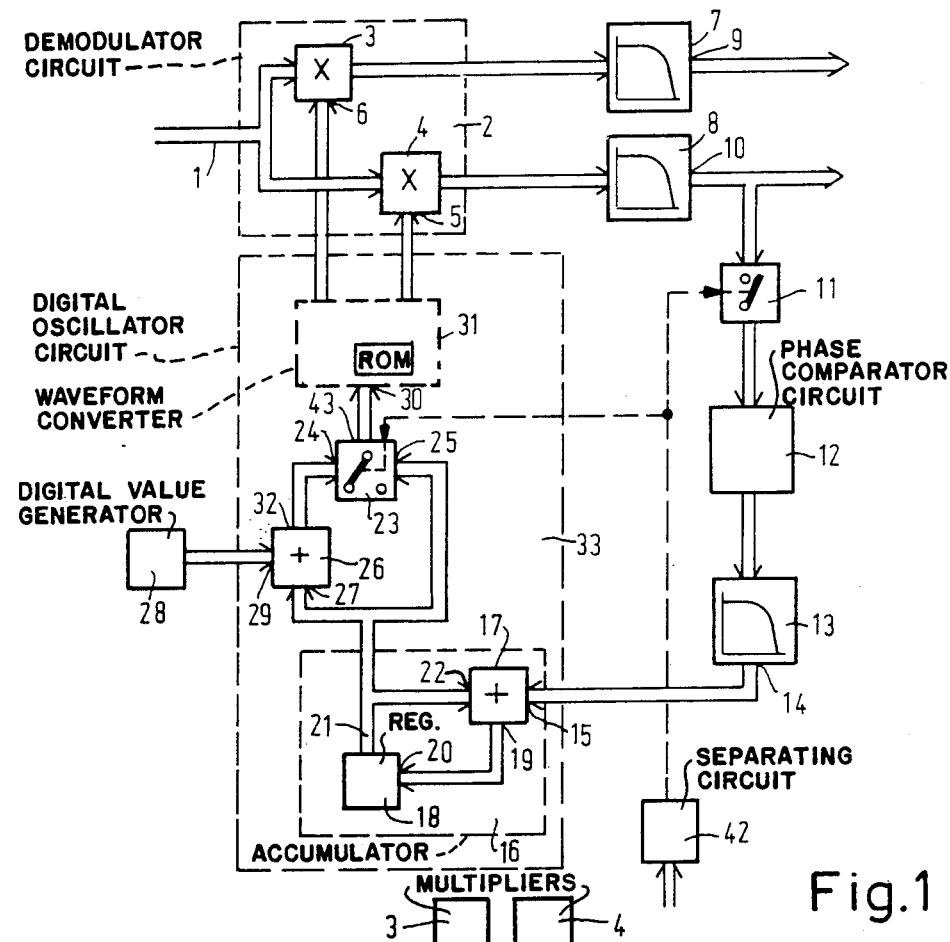
FIG. 1 shows a circuit arrangement according to the invention, comprising a first embodiment of the oscillator

In FIG. 1, the NTSC-encoded chrominance signal which is available as a sequence of binary encoded sampling values and is composed from the color synchronizing signal and the color producing part of the chrominance signal and recovered from a digital NTSC composite color television signal is applied to an input 1 of a demodulator circuit 2. The composite color television signal has previously passed through the customary signal stages of a television receiver, not shown, such as the tuner, picture-intermediate frequency filter and demodulator and is converted in an analog-to-digital converter, also not shown, whose sampling frequency is, for example 13.5 MHz, into a digital signal having a resolution of, for example, 8 bits. The demodulator circuit 2 comprises two multipliers 3 and 4 acting as synchronous demodulators, which are each connected to the input 1 and to each of which one of two reference signals are applied. A sine-shaped reference signal is, for example, applied to an input 5 of the multiplier 4 and a cosine-shaped reference signal to an input 6 of the multiplier 3. The multiplier 3 is followed by a low-pass filter 7 and the multiplier 4 by a low-pass filter 8, which by means of filtering remove the higher frequency signal portions caused by modulation. A first color difference signal V is then available at the output 9 of the low-pass filter 7 and a second color difference signal U at the output 10 of the low-pass filter 8.

The output 10 of the low-pass filter 8 is connected to a switch 11, which is closed during the color synchronizing signal gating period. The color synchronizing signal gating period corresponds to the period of time in which the color synchronizing signal is available, The switch 11 is controlled by a known separating circuit 42 which is customary in a television receiver and produces, for example, horizontal pulses, vertical pulses and also the color synchronizing gating pulse applied to the switch 11, from the digital composite color television signal. The switch 11 is followed by a phase comparator circuit 12 which supplies an output signal corresponding to the relative phase position between the color synchronizing and the reference signals. This output signal is applied to a low-pass filter 13, which suppresses individually occurring signal interference.

The output 14 of the low-pass filter 13 is connected to an input 15 of an accumulator 16 acting as a digital oscillator. The accumulator 16 comprises a (first) modulo-adder 17, and a register 18. The input 15 of the accomulator 16 is at the same time an input of the first adder 17. The output 19 of the first adder 17 is connected to the input 20 of the register 18 and the output 21 of the register 18, which at the same time constitutes an output of the accumulator 16, is connected to a second input 22 of the first adder 17.

The output 21 of the accumulator 16 is connected to an input 27 of a second adder 26 and to an input 25 of a charge-over switch 23. A digital signal produced by a digital value generator 28, which is adjustable by a user, is applied to the second input 29 of the second adder 26. The output 32 of the second adder 26 is connected to an input 24 of the change-over switch 23. The output signal of the change-over switch 23 is applied to the input 30 of a waveform converter 31 via the output 43 of the change-over switch 23. The change-over switch 23 connects, during the color synchronizing signal gating period, the input 25 to the output 43 (second switching position) and during the remaining time connects the input 24 to the output 43 (first switching position). The changeover switch 23 is also controlled by the separating circuit 42 by means of the color synchronizing gating pulse.

The waveform converter 31 comprises a read-only memory which forms from the input signal a sine-shaped reference signal, and a cosine-shaped reference signal each of which is applied to the multiplier 3 and 4 respectively. The accumulator 16, the change-over switch 23, the second adder 26 and the waveform converter 31 form a digital oscillator circuit 33.

In addition to the digital oscillator circuit 33, the low-pass filters 7, 8 and 3 and the phase discriminator 12 each receiver a clock signal whose frequency is equal to the sampling frequency.

The mode of operation of the digital oscillator circuit 33 will now be described in greater detail. In the first adder 17 of the accumulator 16 the input signal of the digital oscillator circuit 33 and the output signal of the register are added together, which then constitutes the output signal of the second adder 17, delayed by one clock period. Thus, the input signal is always added to the output signal of the adder 17 and, in the event of a constant input signal, a linearly increasing output signal is obtained. As the adder 17 has a limiter word length (modulo-adder), an overflow occurs after a plurality of additions in the adder 17, that is to say when the sum of the values at the inputs 15 and 22 exceed the highest obtainable value at the output 19, then only the difference between this sum value and the highest obtainable value is obtained there. During the subsequent clock periods the output signal of the register 18 is always increased by an amount equal to the value at the input 15 and until a new overflow of the adder 17 occurs, a linearly increasing curve is obtained. Consequently, a sawtooth-shaped curve having a constant period when the input signal has a constant value, appears at the output 21 of the accumulator. The phase and frequency of this sawtooth-shaped signal can be changed when the input signal value of the accumulator 16 is increased or reduced.

In the second switching position of the changeover switch 23 the output signal of the accumulator 16 is directly applied to the waveform converter 31. The waveform converter 31 converts the sawtooth-shaped signal into the sine and a cosine signal. The discrete values of a sine and a cosine curve are stored in the read-only memory of the waveform converter 31. The input values of the waveform converter 31 are the relevant addresses of these memory locations, which consequently represent an unambiguous relationship between the sawtooth-shaped curve and the two sine-shaped output signals of the waveform converter 31. In the first switching position of the change-over switch 23 the waveform converter 31 receives the output signal of the accumulator 16, influenced by the second adder 26.

A constant value, which is present at the input 29 of the second adder 26 and which is added to the output signal of the accumulator 16, may effect a phase shift of the sawtooth-shaped signal if none of its output bits more significant than the most significant bit of the accumulator output are used. As the output signal of the adder 26 is then applied to the waveform converter 31 via the change-over switch 23, a phase-shift also occurs between the two sine-shaped reference signals. In that case the second adder 26 may be a modulo-adder having the same word length as the first modulo-adder 18. In the waveform converter 31 only one period of a sine and a cosine curve must then be stored. Because of the large word length in the accumulator 16, the frequency can be adjusted very accurately.

If the high resolution of the accumulator output signal is not required for the waveform converting operation, then the less significant outputs of the accumulator 16 are not connected to the second adder 26 and the input 25 of the change-over switch 23. The adder 26 then has a smaller word length, as the less significant bits are cancelled.

The second adder 26 may alternatively have a larger word length than the first adder 18, so that no overflow occurs anymore at the adder 26 and its output fits more significant than the most significant bit of the accumulator output are used. However, then more than one period of a sine and a cosine curve must be stored in the waveform converter 31.

The function of the overall circuit arrangement of FIG. 1 is described hereinafter. After demodulation and low-pass filtering, the color difference signal U is present at the output 10 during the line trace period and the color difference signal V is present at the output 9. During a portion of the line retrace period the demodulated color synchronizing signal, which acts as a mean value is present at the two outputs. If the relative phase position, prescribed for the demodulation, between the reference signals and the color synchronizing signal is known, the amplitude of the color synchronizing signal acting as a mean value after demodulation, is made equal to zero at the output 10 of the low-pass filter 8. If now the prescribed relative phase position is deviating, then the amount of the amplitude of the demodulated color synchronizing signal is not equal to zero. During the color synchronizing signal gating period the switch 11 is closed so that the phase comparator circuit 12 can determine the relative phase position of the color synchronizing signal. It is alternatively possible to determine the relative phase position from the output of the demodulator which produces the colour difference signal V or from the outputs of both demodulators producing the two color difference signals U and V. The phase comparator circuit 12 conveys, in the prescribed relative phase position between the color synchronizing signal and the reference signal, a positive constant signal which, in case of a phase shift, is increased or reduced, to the accumulator 16 via the low-pass filter 13. In the oscillator 33 the output signal of the accumulator 16 is applied via the change-over switch 23 in the second switching position, so unchanged, to the waveform converter 31.

After the color synchronizing signal gating period the switch 11 is opened and the output signal of the phase comparator circuit 12 is not changed anymore.

As with NTSC-encoded chrominance signals the prescribed phase position of the color producing part of the chrominance signal frequently changes relative to the color synchronizing signal on the transmission path and this phase shift becomes visible as a hue change in the displayed picture, it is possible for NTSC-systems to have this phase shift cancelled by the user. After the color synchronizing signal gating period the change-over switch 23 is in its first switching position and the output signal of the accumulator 16 is applied to the waveform converter 31 via the second adder 26. If a phase shift has occurred on the transmission path, this shift can be eliminated for which the user adjusts in the digital value generator 28 a value which is added to the output signal of the accumulator 16 in the second adder 26 and thus compensates for the phase shift.

Only during the color synchronizing signal gating period the phase located loop of the oscillator circuit 33, controlled by the phase comparator circuit 12, is closed consequently during the remaining period of time a phase shift occurring on the transmission path can be compensated for by the user by setting the digital value generator 28.

Figure 2:
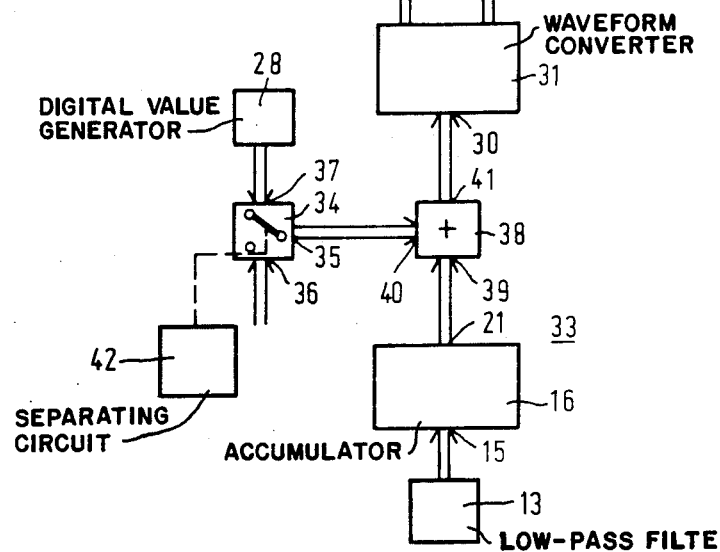
FIG. 2 shows a second embodiment of the oscillator.

FIG. 2 shows a second embodiment of the oscillator circuit 33. Circuit elements having the same function as those in FIG. 1 are given the same reference numerals. The output signal of the accumulator 16 is applied to a second adder 38 via a first input 39. The second input 40 of the second adder 38 is connected to an output 35 of a change-over switch 34. In a first switching position, the output 35 of the change-over switch 34 is connected to the output 37 to which a signal from the digital value generator 28 is applied and in a second switching position the output 35 of the change-over switch 34 is connected to an input 36, at which no signal is available. The output 41 of the second adder 38 is connected to the input 30 of the waveform converter 31.

During the color synchronizing signal gating period the change-over switch 34 is in its second switching position and the output signal of the accumulator 16 is applied to the waveform converter 31 without having been influenced. During the remaining period of time the changeover switch is in its first switching position and applies a value, set in the digital value generator 28, to the second input of the adder 38.

What is claimed is:

1. A color television signal receiver including a circuit arrangement for demodulating an NTSC-encoded chrominance signal available as a sequence of digital values, including an oscillator circuit (33) producing two reference signals of a chrominance subcarrier frequency and said reference signals being different in phase relative to each other, the oscillator circuit comprising an accumulator (16) which produces an output signal, said accumulator incorporating a register (18) coupled at its output to an output (21) of said accumulator and a first modulo-adder (17) coupled at its input to an input of said accumulator and coupled at its output to an input of said register and a waveform converter (31) which forms the reference signals from the accumulator output signal, and a phase comparator circuit (12) determining the phase of the reference signals and receiving during the occurrence of a color synchronizing signal in said NTSC-encoded chrominance signal, a signal produced in at least one demodulator (2) multiplying the chrominance signal by at least one of said reference signals, characterized in that in a first switching position of a change-over switch (23) an adjustable value is added in a second adder (26, 38) to the accumulator output signal and an output signal of the adder is applied to the waveform converter (31) and that the change-over switch (23) is in a second switching position during the occurrence of the color synchronizing signal, in said second position the accumulator output signal is applied to the waveform converter.

2. A color television signal receiver as claimed in claim 1, wherein the change-over switch (23) is provided at an input (30) of the waveform converter (31)

and in the first switching position an output (32) of the second adder (26) and in the second switching position the input (30) of the waveform converter (31) is coupled to said output (21) of the accumulator (16).

3. A color television signal receiver as claimed in claim 1, wherein the adjustable value is applied to the second adder (38) only when the change-over switch (34) is in said first switching position.

4. A color television signal receiver as claimed in any one of the preceding claims, wherein a low-pass filter (13) is arranged between the phase comparator circuit (12) and the oscillator (33).

5. A color television signal receiver as claimed in any one of claims 1-3, wherein the waveform converter (31) includes a read-only memory which produces a sine or a cosine-shaped signal.

6. A color television signal receiver as claimed in any one of claims 1-3, wherein a user-adjustable digital value generator (28) produces the adjustable value.

7. A color television signal receiver as claimed in any one of claims 1-3, wherein at least one switch (11) which is only closed during the occurrence of the color synchronizing signal is arranged between the demodulator (2) and the phase comparator circuit (12).

8. A color television signal receiver as claimed in claim 7, wherein a separating circuit (42) produces a color synchronizing gating pulse from said NTSC-encoded chrominance signal, with which the change-over switch (23, 24) and said at least one switch (11) are controlled.

* * * * *